(12) United States Patent
Huang et al.

(10) Patent No.: US 12,354,242 B2
(45) Date of Patent: Jul. 8, 2025

(54) METHOD FOR DENOISING VIDEOS AND ELECTRONIC DEVICE THEREFOR

(71) Applicant: BIGO TECHNOLOGY PTE. LTD., Singapore (SG)

(72) Inventors: Yi Huang, Guangzhou (CN); Lingxiao Du, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 444 days.

(21) Appl. No.: 17/789,974

(22) PCT Filed: Nov. 18, 2020

(86) PCT No.: PCT/CN2020/129864
§ 371 (c)(1),
(2) Date: Jun. 29, 2022

(87) PCT Pub. No.: WO2021/135702
PCT Pub. Date: Jul. 8, 2021

(65) Prior Publication Data
US 2022/0392019 A1    Dec. 8, 2022

(30) Foreign Application Priority Data

Dec. 31, 2019   (CN) .......................... 201911418935.0

(51) Int. Cl.
*G06T 5/70*   (2024.01)
*G06T 1/20*   (2006.01)
(Continued)

(52) U.S. Cl.
CPC ................. *G06T 5/70* (2024.01); *G06T 1/20* (2013.01); *G06T 1/60* (2013.01); *G06T 5/50* (2013.01);
(Continued)

(58) Field of Classification Search
None
See application file for complete search history.

(56) References Cited

U.S. PATENT DOCUMENTS

2017/0372456 A1* 12/2017 Lee ........................... G06T 5/70
2018/0089864 A1    3/2018 Gindele et al.
(Continued)

FOREIGN PATENT DOCUMENTS

CN    102254323 A    11/2011
CN    102393955 A    3/2012
(Continued)

OTHER PUBLICATIONS

Zhang, Fang; "Research on Image Poisson Denoising," Information Science and Technology, Chinese Master's Theses Full-Text Database, No. 02, Feb. 15, 2018, ISSN: 1674-024, chapters 2-4. (Year: 2018).*

(Continued)

*Primary Examiner* — Amandeep Saini
*Assistant Examiner* — Caroline Tabancay Duffy
(74) *Attorney, Agent, or Firm* — Kolitch Romano Dascenzo Gates LLC (57) ABSTRACT

Embodiments of the present application provide a method for denoising videos. The method comprises: acquiring, by the CPU, video frame images by acquiring video data and decoding the video data; loading, by the GPU, the video frame images from the CPU; acquiring, by the GPU, first images by denoising the video frame images using a predetermined non-local means (NLM) denoising algorithm; acquiring, by the GPU, second images by denoising the first images using a predetermined non-local Bayes (NLB) denoising algorithm; and acquiring, by the CPU, denoised video data by acquiring the second images from the GPU and encoding the second images.

18 Claims, 4 Drawing Sheets

(51) Int. Cl.
  *G06T 1/60* (2006.01)
  *G06T 5/50* (2006.01)
(52) U.S. Cl.
  CPC .............. *G06T 2207/10016* (2013.01); *G06T 2207/20021* (2013.01); *G06T 2207/20192* (2013.01)

(56) References Cited

U.S. PATENT DOCUMENTS

| | | | | |
|---|---|---|---|---|
| 2018/0184128 | A1* | 6/2018 | Chen | ........................ H04N 19/86 |
| 2019/0108622 | A1* | 4/2019 | Douady-Pleven | ........ G06T 5/50 |
| 2019/0199966 | A1* | 6/2019 | Choi | ........................ H04N 7/152 |
| 2020/0099944 | A1* | 3/2020 | Chen | ........................ H04L 47/29 |
| 2021/0166354 | A1* | 6/2021 | Veit | ........................... G06T 5/70 |

FOREIGN PATENT DOCUMENTS

| | | | | |
|---|---|---|---|---|
| CN | 103745447 | A | * 4/2014 | |
| CN | 107085833 | A | 8/2017 | |
| CN | 107292851 | A | 10/2017 | |
| CN | 107730464 | A | * 2/2018 | .............. G06T 1/20 |
| CN | 109360156 | A | 2/2019 | |
| CN | 111179201 | A | 5/2020 | |
| JP | 2007323480 | A | * 12/2007 | |

OTHER PUBLICATIONS

Lebrun, M. et al.; "A Nonlocal Bayesian Image Denoising Algorithm," SIAM J. Imaging Sciences, vol. 6, No. 3, pp. 1665-1688; Society for Industrial and Applied Mathematics 2013.

International Search Report of the International Searching Authority for State Intellectual Property Office of the People's Republic of China in PCT application No. PCT/CN2020/129864 issued on Feb. 24, 2021, which is an International application corresponding to this U.S. application.

Zhang, Fang; "Research on Image Poisson Denoising," Information Science and Technology, Chinese Master's Theses Full-Text Database, No. 02, Feb. 15, 2018, ISSN: 1674-024, chapters 2-4.

Liang, Guangshun, et al.; "Image denoising based on bilateral filtering and non-local means," Journal of Optoelectronics . Laser, vol. 26 No. 11, Nov. 30, 2015, pp. 2231-2235.

Lebrun, M. et al.; "A Nonlocal Bayesian Image Denoising Algorithm," SIAM J. Imaging Sciences, vol. 6, No. 3, pp. 1665-1688.

Sun, Yuzhe et al.; "Image Denoising Based on Bilateral Filtering Combined with Non-local Means Filtering," Journal of Guangxi Normal University (Natural Science Edition), vol. 35 No.2, Apr. 30, 2017, pp. 32-38.

* cited by examiner

METHOD FOR DENOISING VIDEOS AND ELECTRONIC DEVICE THEREFOR

CROSS-REFERENCE TO RELATED APPLICATION

This application is a U.S. national stage of international application No. PCT/CN2020/129864, filed on Nov. 18, 2020, which claims priority to Chinese Patent Application No. 201911418935.0, filed on Dec. 31, 2019 and entitled "VIDEO DENOISING METHOD AND ELECTRONIC EQUIPMENT," the disclosures of which are incorporated herein by reference in their entireties.

TECHNICAL FIELD

The present disclosure relates to the technical field of image processing, and in particular, relates to a method for denoising videos and an electronic device therefor.

BACKGROUND

With the development of network technologies, more and more people like sharing videos they captured on a social platform or viewing videos shared by others on the social platform.

In many cases, a user casually turns on a camera of a mobile phone to capture a video. The video captured by the camera under poor light conditions may contain significant noise. The noise may affect the user's subjective experience and affect the encoding, decoding, and compression of the video as well.

SUMMARY

Embodiments of the present disclosure provide a method for denoising videos and an electronic device therefor.

According to a first aspect of the embodiments of the present disclosure, a method for denoising videos is provided, wherein the method is applicable to an electronic device including a central processing unit (CPU) and a graphics processing unit (GPU). The method includes:
  acquiring, by the CPU, video frame images by acquiring video data and decoding the video data;
  loading, by the GPU, the video frame images from the CPU;
  acquiring, by the GPU, first images by denoising the video frame images using a predetermined non-local means (NLM) denoising algorithm;
  acquiring, by the GPU, second images by denoising the first images using a predetermined NLB denoising algorithm; and
  acquiring, by the CPU, denoised video data by acquiring the second images from the GPU and encoding the second images.

According to a second aspect of the embodiments of the present disclosure, another method for denoising videos is further provided, wherein the method is applicable to an electronic device including a CPU and a GPU. The method includes:
  acquiring, by the CPU, video frame images by acquiring video data and decoding the video data;
  loading, by the GPU, the video frame images from the CPU;
  determining, by the GPU, a noise level of the video frame images;
  acquiring, by the GPU based on the noise level, first images by denoising the video frame images using a predetermined first image denoising algorithm, or second images by acquiring the first images by denoising the video frame images using the predetermined first image denoising algorithm and denoising the first images using a predetermined second image denoising algorithm; and
  acquiring, by the CPU, denoised video data by acquiring the first images from the GPU and encoding the first images, or by acquiring the second images from the GPU and encoding the second images.

According to a third aspect of the embodiments of the present disclosure, an electronic device including a CPU and a GPU is further provided.

The CPU includes:
  a video data decoding module, configured to acquire video frame images by acquiring video data and decoding the video data; and
  a video data encoding module, configured to acquire denoised video data by acquiring second images from the GPU and encoding the second images.

The GPU includes:
  a video frame image loading module, configured to load the video frame images from the CPU;
  a first image denoising module, configured to acquire first images by denoising the video frame images using a predetermined NLM denoising algorithm; and
  a second image denoising module, configured to acquire the second images by denoising the first images using a predetermined NLB denoising algorithm.

According to a fourth aspect of the embodiments of the present disclosure, another electronic device including a CPU and a GPU is further provided.

The CPU includes:
  a video data decoding module, configured to acquire video frame images by acquiring video data and decoding the video data; and
  a video data encoding module, configured to acquire denoised video data by acquiring first images from the GPU and encoding the first images, or by acquiring second images from the GPU and encoding the second images.

The GPU includes:
  a video frame image loading module, configured to load the video frame images from the CPU;
  a noise level determining module, configured to determine a noise level of the video frame images; and
  an image denoising module, configured to acquire, based on the noise level, first images by denoising the video frame images using a predetermined first image denoising algorithm, or second images by acquiring the first images by denoising the video frame images using the predetermined first image denoising algorithm and denoising the first images using a predetermined second image denoising algorithm.

According to a fifth aspect of the embodiments of the present disclosure, a device is further provided, wherein the device includes a processor, a memory, and a computer program stored in the memory and runnable on the processor. The processor, when loading and running the computer program, is caused to perform the processes of the foregoing method for denoising videos.

According to a sixth aspect of the embodiments of the present disclosure, a computer-readable storage medium is further provided. The computer-readable storage medium stores a computer program. The computer program, when loaded and run by a processor of a device, causes the device to perform the processes of the foregoing method for denoising videos.

BRIEF DESCRIPTION OF THE DRAWINGS

For clearer descriptions of the technical solutions in the embodiments of the present disclosure or in the prior art, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure.

At present, existing image denoising algorithms include a pixel-based denoising algorithm, a patch matching-based denoising algorithm, a transform domain-based denoising algorithm, and a machine learning-based denoising algorithm. In practice, these algorithms either have a poor denoising effect or need long execution duration.

A non-local Bayes (NLB) denoising algorithm, obtained through experiments in recent years, is a compromise choice between the denoising effect and the execution duration.

The NLB denoising method includes two-step denoising. During first-step denoising, a subtraction operation on a covariance matrix may lead to a negative definite matrix, resulting in an incompletely stable image denoising effect.

An NLB denoising method involves two-step denoising. A reason for the two-step denoising is that a denoising effect of the NLB algorithm depends on accuracy of similar patch grouping. In the first step, the grouping of patches is interfered due to the existence of noise. In the case that the first-step denoising is completed, it is more accurate to perform patch matching using an image with much noise removed. In this case, an original noisy image and a denoised image are all segmented into patches in the same way as the denoised image, and the noisy image is denoised again using the NLB denoising algorithm. Another reason is that a mean value and variance of the denoised image are closer to a mean value and variance of the image without noise.

The NLB denoising algorithm is as follows:

$$P = \bar{\tilde{P}} + [C_{\tilde{p}} - \sigma^2 I] C_{\tilde{p}}^{-1} (\tilde{p} - \bar{\tilde{P}}),$$

wherein P represents an estimated value of a denoised image patch, $\bar{\tilde{P}}$ represents an expectation of a noisy image patch, $C_{\tilde{p}}$ represents a covariance matrix of a noisy image patch, and σ represents a noise variance.

In the traditional NLB denoising method, the NLB denoising algorithm is used in both steps of denoising.

During the first-step denoising, $\sigma^2 I$ may be subtracted from a covariance matrix $C_{\tilde{p}}$ of a similar patch, causing the covariance matrix $C_{\tilde{p}}$ to become a negative definite matrix, thereby making probability calculation meaningless.

One of the core ideas of the embodiments of the present disclosure is that the two-step denoising mechanism of the NLB denoising method is still adopted and the two steps of denoising can be optimized separately.

The greatest contribution of the first-step denoising is to achieve more accurate patch matching. Therefore, in the embodiments of the present disclosure, for acceleration, a non-local means (NLM) denoising algorithm can be used to perform the first-step denoising, and the NLB denoising algorithm is abandoned. After the first-step denoising is performed using the NLM denoising algorithm, the second-step denoising is performed using the NLB denoising algorithm. Experiments prove that such a strategy has little impact on the final denoising effect.

During the first-step denoising, in addition to using the NLM denoising algorithm to ensure the mathematical significance of calculation, algorithm optimization and operation acceleration are also performed on the NLM denoising algorithm in the embodiments of the present disclosure.

During the second-step denoising, algorithm optimization and operation acceleration are also performed on the NLB denoising algorithm in the embodiments of the present disclosure.

Through the foregoing optimization, a good denoising effect can be achieved, and the operation duration of the algorithms can be reduced when using the method for denoising videos in the embodiments of the present disclosure.

In addition to video denoising, the above improved algorithm is also applicable for denoising of images in other fields, such as unmanned aerial vehicle images, remote sensing images, scanned images, fax images, medical images, and military reconnaissance images.

The method for denoising videos in the present disclosure is described below through specific embodiments.

Figure 1:
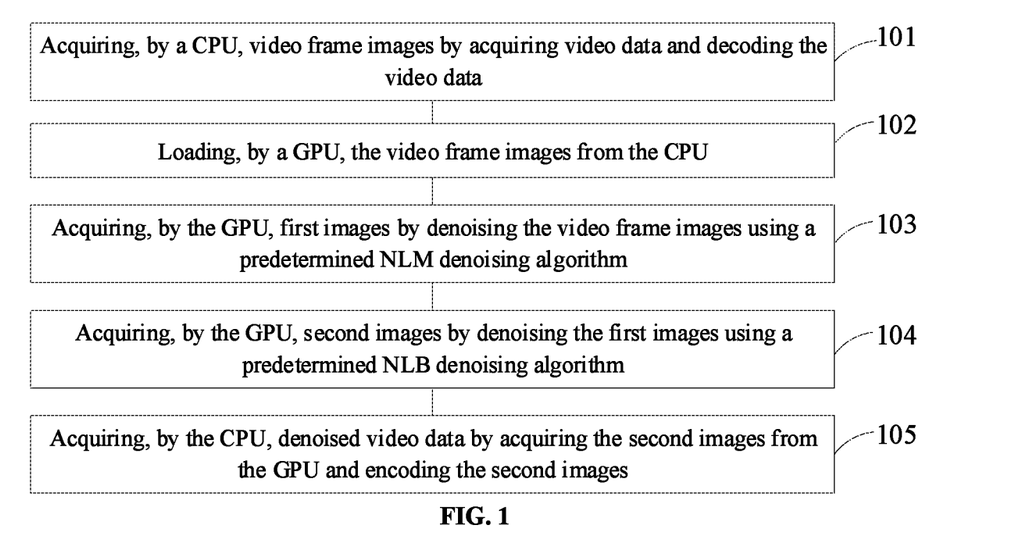
FIG. 1 is a flowchart of a method for denoising videos according to an embodiment of the present disclosure.

Referring to FIG. 1, FIG. 1 is a flowchart of a method for denoising videos according to an embodiment of the present disclosure. The method is applicable to an electronic device including a CPU and a GPU and may specifically include the following processes.

In process 101, video frame images are acquired by the CPU by acquiring video data and decoding the video data.

In practice, a user may input a captured video to the electronic device including the CPU and the GPU for denoising. The CPU acquires the video data captured by the user and decodes the video data into a plurality of video frame images. The GPU performs an image denoising operation. In practice, both the CPU and the GPU can execute an image denoising algorithm. Considering a structural feature of the GPU, the GPU is more suitable for image processing.

In this embodiment of the present disclosure, an execution process of the image denoising algorithm can be improved based on a multi-thread parallel structure of the GPU. An image denoising process can be accelerated by the GPU, thereby shortening the processing duration.

In process 102, the video frame images are loaded by the GPU from the CPU.

Specifically, the GPU may allocate a specific size of video memory based on the data volume of the video frame images and load the video frame images into the video memory.

In process 103, first images are acquired by the GPU by denoising the video frame images using a predetermined NLM denoising algorithm.

The NLB denoising method involves two-step denoising. Traditionally, both the two steps of denoising are implemented using the NLB denoising algorithm. In this embodiment of the present disclosure, the first-step denoising is performed using the NLM denoising algorithm that replaces the NLB denoising algorithm used in the first step of traditional NLB denoising method.

In process 104, second images are acquired by the GPU by denoising the first images using a predetermined NLB denoising algorithm.

The GPU acquires the second images by denoising pixels in the first images using the NLB denoising algorithm.

In process 105, denoised video data is acquired by the CPU by acquiring the second images from the GPU and encoding the second images.

In the case that the GPU acquires the second images by denoising all the loaded video frame images, the CPU acquires the denoised video data by encoding all the second images. That is, after the GPU denoises all the loaded video frame images to acquire the second images, the CPU encodes all the second images to acquire the denoised video data.

In this embodiment of the present disclosure, during the implementation of the two-step denoising of the NLB denoising method, the first-step denoising is performed using the NLM denoising algorithm replacing the NLB denoising algorithm, which avoids the problem of the unstable denoising effect caused by using the NLB denoising algorithm to perform the first-step denoising.

Figure 2:
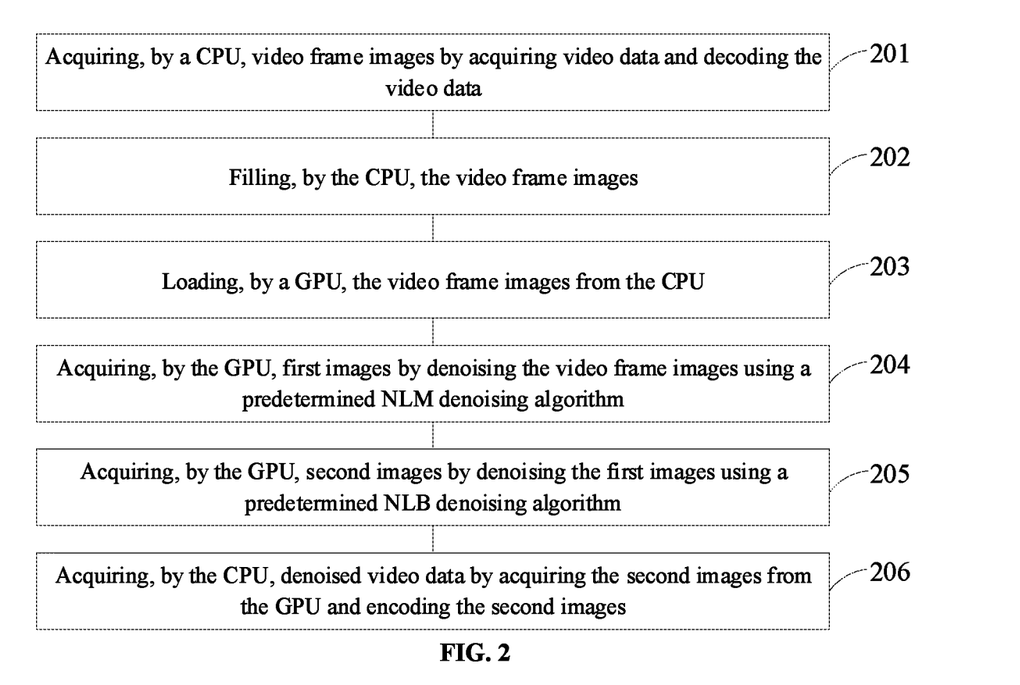
FIG. 2 is a flowchart of another method for denoising videos according to an embodiment of the present disclosure.

FIG. 2 is a flowchart of another method for denoising videos according to an embodiment of the present disclosure. The method is applicable to an electronic device including a CPU and a GPU and may specifically include the following processes.

In process 201, video frame images are acquired by the CPU by acquiring video data and decoding the video data.

In process 202, the video frame images are filled by the CPU.

Both the NLM denoising algorithm and the NLB denoising algorithm are based on image patch matching, wherein an image patch is usually determined by taking a pixel as a center. For example, a 5×5 image patch is determined by taking a pixel as a center. For a pixel at a boundary of the video frame image, an image patch cannot be determined by taking the pixel as a center, such that the image patch matching cannot be performed. Therefore, the original video frame images need to be filled, to ensure that image patch matching can also be performed for pixels at original boundaries without separate determination.

In process 203, the video frame images are loaded by the GPU from the CPU.

The GPU loads the video frame images filled by the CPU from the CPU.

In process 204, first images are acquired by the GPU by denoising the video frame images using a predetermined NLM denoising algorithm.

In this embodiment of the present disclosure, the NLM denoising algorithm is optimized to improve the image denoising effect. In a traditional NLM algorithm, an image patch is constructed by taking each pixel in an image as a center, and the image patch is called a reference image patch, for example, an image patch with a size of 5×5. Then a search box is constructed by taking the reference image patch as a center, for example, a search box with a size of 16×16.

Then, a similar image patch of the reference image patch is searched in the search box. Specifically, for each pixel in the search box, an adjacent image patch is constructed by taking the pixel as a center, and it is determined whether the adjacent image patch is a similar image patch. A similarity between two image patches may be measured by a pixel distance. Pixel distances between all pixels in the two image patches are compared as follows:

$$\|u(Ni)-u(Nj)\|_2^2,$$

wherein i represents the reference image patch, and j represents the adjacent image patch.

For example, in the case that each pixel patch has a size of 5×5, pixel distances between the 25 pixels in one image patch and the pixels at corresponding positions in another image patch are sequentially compared. The pixel distance is measured by absolute value. The pixel distance is a difference between pixel values. For example, in the case that a value of a pixel is 255 and a value of another pixel is 240, the pixel distance is 15.

In the case that $\|u(Ni)-u(Nj)\|_2^2$ is less than a predetermined pixel distance threshold, the adjacent image patch is determined as a similar image patch.

For two image patches, the greater the difference between the two image patches is, the smaller a weight of a central pixel of the adjacent image patch is. Intuitively, the difference is inversely related to the weight. A specific weight calculation formula is as follows:

$$w(i,j) = \frac{1}{Z(i)} e^{-\frac{\|u(Ni)-u(Nj)\|_2^2}{h^2}},$$

wherein Z(i) is a normalized parameter, namely, the sum of all weights.

$$Z(i) = \sum_j e^{-\frac{\|u(Ni)-u(Nj)\|_2^2}{h^2}},$$

wherein $h^2$ represents the size of the image patch.

Only the pixel distance is considered in the existing weight calculation method, therefore the denoising using the traditional NLM algorithm may cause blurs of image edges. In view of this, in this embodiment of the present disclosure, the weight calculation method is improved. A coordinate distance is also considered to calculate the weight, which can improve the edge-preserving property of the algorithm, thereby preserving more details on image edges upon denoising. The coordinate distance is the distance between two pixels in the image. That is, a pixel closer to a reference pixel may have a larger weight.

In this embodiment of the present disclosure, the weight may be calculated using the following formula:

$$w(i, j) = \frac{1}{C(i)} \exp\left(-\frac{d(i, j)}{h^2}\right) f(x) W_s(i, j) W_r(i, j),$$

wherein C(i) is a normalized parameter, $$\exp\left(-\frac{d(i, j)}{h^2}\right)$$

represents the original pixel distance, namely, the pixel distance between the entire image patches, and d(i,j) represents the pixel distance between a pixel i and a pixel j.

$$f(x) = \begin{cases} \frac{1}{2}\left(1 - \left(\frac{d(i, j)}{h}\right)^2\right)^2, & 0 < d(i, j) \le h; \\ 0, & \text{else}. \end{cases}$$

which is used to make the weight function steeper.

$$W_s(i, j) = \exp\left(-\frac{D(i, j)^2}{2\sigma_s^2}\right)$$

represents the coordinate distance, wherein D(i,j) represents the coordinate distance between the pixel i and the pixel j, and $\sigma_s$ represents the variance of the pixel distance.

$$W_r(i, j) = \exp\left(-\frac{|z(j) - z(i)|^2}{2\sigma_r^2}\right)$$

represents the pixel distance, wherein |z(j)−z(i)| represents the pixel distance of the central pixels i and j of the patches, and $\sigma_r$ represents an estimated variance of noise.

Further, the function ƒ(x) is used to make the curve of the weight function steeper, such that a weight of an image patch with a lower similarity can be reduced.

In another aspect, the similar image patches of the reference image patch include the reference image patch, therefore the reference image patch may have a large weight. In the case that the central pixel of the reference image patch is a noise point, it may be unfavorable for noise removal. In view of this, an improvement is made in this embodiment of the present disclosure. That is, the original weight of the reference image patch is multiplied by a coefficient less than 1 (for example, 0.5). The weight of the reference image patch is reduced, such that an error caused by the pixel being a noise point can be reduced.

In this embodiment of the present disclosure, process 204 may include the following sub-processes.

In sub-process S11, threads are allocated by the GPU to pixels in the video frame images.

The GPU allocates the threads to the pixels in the video frame images to execute the improved NLM algorithm. The GPU may allocate one thread to a plurality of pixels. That is, one thread successively denoises the plurality of pixels using the improved NLM algorithm. Alternatively, the GPU may allocate one thread to one pixel. That is, one thread denoises only one pixel using the improved NLM algorithm.

In this embodiment of the present disclosure, in addition to improving the NLM algorithm, a GPU with a compute unified device architecture (CUDA) may be used to accelerate the execution of the algorithm. Threads of GPU are organized in terms of grid. Each grid includes a plurality of thread blocks. A plurality of threads in a same thread block have a same instruction address, can perform execution in parallel, and communicate with each other in the block through the shared memory.

In practice, the CPU with the CUDA performs execution in units of thread blocks. Each of the thread blocks is allocated to a streaming multiprocessor (SM) of hardware to perform an operation. Threads in a thread block are further executed in groups, i.e., in units of warps. Currently, a warp in the CUDA has a size of 32. In other words, 32 threads are executed together by forming a warp. The threads in the same warp execute a same instruction but process different data. An SM executes only one warp in one thread block at a time. To prevent waste of computing resources of the warp, the size of the thread block is usually set to a multiple of 32. For example, the size of the thread block may be set to 8×8, 16×16, 32×32, or the like.

In this embodiment of the present disclosure, the following optimization is made based on the property of the CUDA.

In the case that the GPU allocates the threads, the GPU segments the video frame image into a plurality of first sub-images, configures the threads corresponding to the pixels belonging to a same first sub-image to a same thread block, and allocates data required for executing the NLM denoising algorithm to the thread block. In the case that the threads in the same thread block are executed in terms of warps, the threads in the warp cooperatively read the required data into the shared memory of the GPU.

For example, the video frame image is segmented into a plurality of sub-images with sizes of 8×8, and threads responsible for processing pixels in a sub-image are configured to a same thread block. In the case that one thread is responsible for processing one pixel in the sub-image, 64 threads are responsible for processing one sub-image with the size of 8×8. The size of the thread block may be set to 64, and the thread block with the size of 64 may be executed in the form of 2 warps. The data required by the thread block for executing the NLM denoising algorithm is data of the search box.

Figure 3:
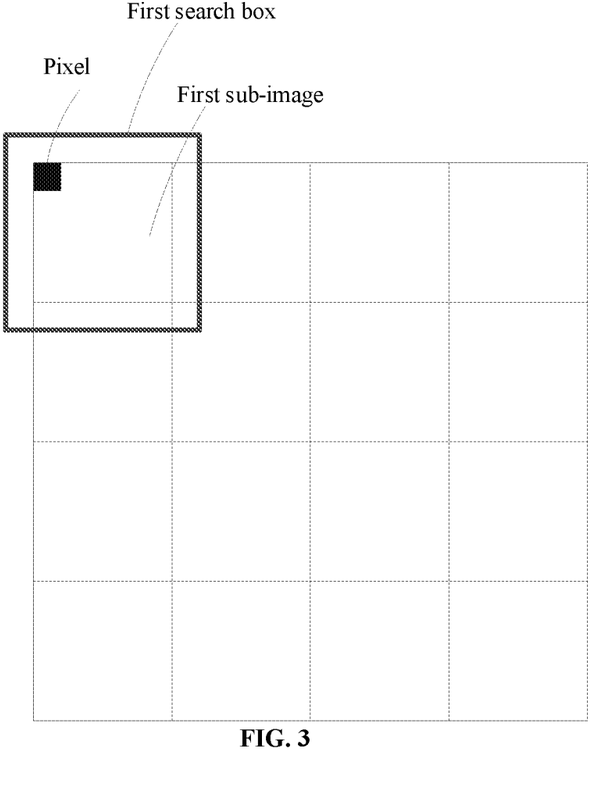
FIG. 3 is a schematic diagram of a first search box corresponding to a first sub-image according to an embodiment of the present disclosure.

In the improved NLM denoising algorithm in this embodiment of the present disclosure, a same first search box is set for the pixels in the same first sub-image. FIG. 3 is a schematic diagram of a first search box corresponding to a first sub-image according to an embodiment of the present disclosure. For each of the pixels in the same first sub-image, the first similar image patch corresponding to the first reference image patch with the pixel as a center is searched in the same first search box. Because the threads for the same first sub-image are in a same thread block, the data of the first search box can be read into the shared memory through the cooperative operation of the threads in the same thread block.

A search box with a size of 16×16 is taken as an example. Without the cooperative operation, each thread needs to read the search box with the size of 16×16. With the cooperative operation of the thread block, in the thread block with a size of 64, each thread needs to read only 4 pixels into the shared memory. This greatly reduces the volume of data read by the thread and improves the processing speed of the algorithm.

In the case that the data required for executing the NLM denoising algorithm is read into the shared memory, all threads in the same thread block can read the data from the shared memory.

In addition, currently, the NLM denoising algorithm provided by OpenCV usually reads data from a global memory of the GPU, which is a very slow way of reading data. In view of this, in this embodiment of the present disclosure, all the data required for executing the NLM denoising algorithm is read into the shared memory, such that the data reading speed can be greatly improved.

In sub-process S12, a first reference image patch of the pixel and a corresponding first similar image patch are determined by the thread.

The thread searches for the first similar image patch corresponding to the first reference image patch in the first search box. Specifically, the thread determines an adjacent image patch by taking each of the pixels in the first search box as a center. For each of the adjacent image patches, the thread determines whether the adjacent image patch is a similar image patch. In some cases, a large number of first similar image patches (for example, hundreds of first similar image patches) may be found. In the case that the subsequent algorithm is executed with a large number of similar patches, too much memory may be occupied. Because the GPU algorithm is not suitable for occupying too much memory, the algorithm is not suitable for sorting and filtering the found first similar image patches.

In this embodiment of the present disclosure, for reducing the number of found first similar image patches, a search area is reduced. That is, not all adjacent image patches in the first search box are used to determine whether the adjacent image patch is a first similar image patch. Instead, the adjacent image patches are selected at a predetermined first pixel interval, and it is determined whether the selected adjacent image patches are first similar image patches.

In this embodiment of the present disclosure, sub-process S12 may further include the following processes.

In sub-process S121, the first reference image patch is determined by the thread by taking a pixel as a center.

In sub-process S122, the corresponding first search box is acquired by the thread from the shared memory of the GPU.

Because the data (including the data of the first search box) required by the thread for executing the NLM denoising algorithm is read into the shared memory through the cooperative operation of the thread block, the thread can acquire the corresponding first search box from the shared memory.

In sub-process S123, the first similar image patch corresponding to the first reference image patch is determined by the thread in the first search box at the predetermined first pixel interval.

In sub-process S13, a pixel distance and a coordinate distance of the first similar image patch relative to the first reference image patch are determined by the thread.

In sub-process S14, a weight of the first similar image patch is calculated by the thread based on the pixel distance and the coordinate distance.

In sub-process S15, a denoised value of the pixel is determined by the thread based on the weight of the first similar image patch.

In the case that the weights of all similar image patches are calculated, a weighted average of pixel values of central pixels of the similar image patches is calculated based on the weights of the similar image patches, and the weighted average is determined as the denoised pixel value of the central pixel of the reference image patch.

In sub-process S16, an image determined based on all denoised pixels is determined by the GPU as the first image.

In process 205, second images are acquired by the GPU by denoising the first images using a predetermined NLB denoising algorithm.

The GPU acquires the second images by denoising each of the pixels in the first images using the NLB denoising algorithm.

In process 206, denoised video data is acquired by the CPU by acquiring the second images from the GPU and encoding the second images.

In the case that the GPU acquires the second images by denoising all the loaded video frame images, the CPU acquires the denoised video data by encoding all the second images.

In this embodiment of the present disclosure, the NLB denoising algorithm is also optimized.

The traditional NLB denoising algorithm is as follows:

$$P = \bar{P} + [C_{\tilde{p}-\sigma}{}^2 I] C_{\tilde{P}}{}^{-1} (\tilde{p} - \bar{P}),$$

wherein P represents an estimated value of a denoised image patch, $\bar{P}$ represents a mean value of an image patch with noise, $C_{\tilde{p}}$ represents a covariance matrix of the image patch with noise, and σ represents a noise variance.

In the existing NLB two-step denoising method, the formula of first-step denoising is $\hat{P}_1 = \bar{P} + C_{\tilde{p}} [C_{\tilde{p}} - \sigma^2 I]^{-1} (\tilde{p} - \bar{P})$, and the formula of second-step denoising is $\hat{P}_2 = \bar{P} + C_{\tilde{p}_1} [C_{\tilde{p}_1} - \sigma^2 I]^{-1} (\tilde{p} - \bar{P})$, wherein $\hat{P}_1$ represents an estimated value of the image patch acquired upon first-step denoising, $\hat{P}_2$ represents an estimated value of the image patch acquired upon second-step denoising, $\bar{P}_1$ represents a mean value of the image patch in the image acquired upon first-step denoising, and $C_{\tilde{p}_1}$ represents a covariance matrix of the image patch in the image acquired upon first step-denoising.

In practice, the denoising based on the formula of the second-step denoising may result in the loss of some image details. In view of this, in this embodiment of the present disclosure, the formula of the second-step denoising is improved as follows:

$$\hat{P}_2 = \bar{P} + C_{\tilde{p}_1} [C_{\tilde{p}_1} - \sigma^2 I] (\tilde{p} - \bar{P}).$$

In the improved formula of the second-step denoising, the mean value of the image patch in the original image rather than the mean value of the image patch in the image acquired upon first-step denoising is used during calculation. Therefore, the second-step denoising can restore some details of the original image.

In this embodiment of the present disclosure, process 206 may further include the following sub-processes.

In sub-process S21, threads are allocated by the GPU to pixels in the first images.

In this embodiment of the present disclosure, the following optimization is made based on the property of the CUDA.

Upon allocating the threads, the GPU segments the first image into a plurality of second sub-images, configures the threads corresponding to the pixels belonging to a same second sub-image to a same thread block, and allocates data required for executing the NLB denoising algorithm to the thread block. In the case that the threads in the same thread block are executed in terms of warps, the threads in the warp cooperatively read the required data into the shared memory of the GPU. The data required by the thread block for executing the NLB denoising algorithm is data of a search box.

In the improved NLB denoising algorithm in this embodiment of the present disclosure, a same second search box is set for pixels in a same second sub-image. For each of the pixels in the same second sub-image, a second similar image patch corresponding to a second reference image patch with the pixel as a center is searched in the same second search box. Because the threads for the same second sub-image are in the same thread block, the data of the second search box can be read into the shared memory through the cooperative operation of the threads in the same thread block. In the case that the data required for executing the NLB denoising algorithm is read into the shared memory, all threads in the same thread block can read the data from the shared memory.

The number of registers in the GPU is limited. That is, the number of variables that can be defined on the GPU is limited. The number of registers being used (the number of variables) may affect concurrency.

The NLB denoising algorithm is complex and requires many local variables. Therefore, in practical code implementation, on the one hand, previously defined arrays and the like need to be reusable in subsequent processes of the algorithm. On the other hand, the most frequently used variables in the algorithm need to be stored in the registers.

Because there are needs to calculate the covariance matrix and store similar patches and other information in the NLB denoising algorithm, a lot of local memory is required. Therefore, in this embodiment of the present disclosure, a large amount of memory reuse can be performed to reduce memory overhead.

Through the foregoing optimization, the number of registers used can be reduced, such that more threads can be simultaneously run, thereby improving the concurrency of the algorithm and greatly reducing the calculation duration of the algorithm. The calculation duration can be reduced by 30% in practice.

In sub-process S22, a second reference image patch of the pixel in the first image and a corresponding second similar image patch are determined by the thread.

The thread searches for the second similar image patch corresponding to the second reference image patch in the second search box. Specifically, the thread determines an adjacent image patch by taking each pixel in the second search box as a center. For each of the adjacent image patches, it is determined whether the adjacent image patch is a similar image patch.

In this embodiment of the present disclosure, for reducing the number of found second similar image patches, a search area is reduced. That is, not all adjacent image patches in the second search box are used to determine whether the adjacent image patch is a second similar image patch. Instead, the adjacent image patches are selected at a predetermined second pixel interval, and it is determined whether the selected adjacent image patches are second similar image patches.

The sub-process S22 may further include the following processes.

In sub-process S221, the second reference image patch is determined by the thread by taking the pixel in the first image as a center.

In sub-process S222, the corresponding second search box is acquired by the thread from the shared memory of the GPU.

Because the data (including the data of the second search box) required by the thread for executing the NLB denoising algorithm is read into the shared memory through the cooperative operation of the thread block, the thread can acquire the corresponding second search box from the shared memory.

In sub-process S223, the second similar image patch corresponding to the second reference image patch is determined by the thread in the second search box at the predetermined second pixel interval.

In sub-process S23, a covariance matrix of the second reference image patch is calculated by the thread based on the second similar image patch and the second reference image patch.

The covariance matrix of the second reference image patch is $C_{\tilde{p}_1}$ in the foregoing improved formula of the second-step denoising.

In sub-process S24, a mean value of the first reference image patch is calculated by the thread based on the first reference image patch and the first similar image patch.

The mean value of the first reference image patch is $\tilde{\bar{P}}$ in the foregoing improved formula of the second-step denoising. $\tilde{\bar{P}}$ needs to be calculated based on the first reference image patch of the pixel and the corresponding first similar image patch in the original video frame image.

In sub-process S25, denoised pixel values of the second reference image patch are calculated by the thread based on the covariance matrix of the second reference image patch and the mean value of the first reference image patch.

Specifically, estimated values of the second reference image patch upon denoising may be acquired based on the foregoing improved formula of the second-step denoising.

In sub-process S26, the denoised value of the pixel is determined by the thread based on all denoised second reference image patches including the pixel.

All pixels in the second reference image patch are denoised based on the improved formula of the second-step denoising. That is, a pixel, in addition to being denoised in the second reference image patch with the pixel as a center, is also denoised in second reference image patches with other pixels as centers, such that the pixel has a plurality of denoised estimated values. The final estimated value of the pixel upon denoising is an average of the estimated values of the pixel in all denoised second reference image patches including the pixel.

In sub-process S27, an image determined based on all denoised pixels is determined by the GPU as the second image.

In this embodiment of the present disclosure, prior to process 206, the GPU may determine a noise level of the video frame images. In the case that the noise level is greater than or equal to a predetermined noise level threshold, the GPU acquires the second images by denoising the first images using the predetermined NLB denoising algorithm. In the case that the noise level is less than the predetermined noise level threshold, the GPU does not acquire the second images by denoising the first images using the predetermined NLB denoising algorithm. The noise level is measured by a noise variance sigma. For example, assuming that the noise level threshold is 10, in the case that the noise level of the video frame images is less than 10, only the NLM denoising algorithm is used to perform denoising. In the case that the noise level is greater than or equal to 10, the NLB denoising algorithm is used to perform denoising after the NLM denoising algorithm is used to perform denoising.

In this embodiment of the present disclosure, the GPU determining the noise level of the video frame images may include the following processes.

The GPU determines a number of the loaded video frame images. In the case that the number of the loaded video frame images is less than a predetermined frame number threshold, the GPU determines noise levels of the video frame images at a predetermined frame interval. The GPU determines an average of the determined noise levels as the noise level of the video frame images. In the case that the number of the loaded video frame images is greater than or equal to the predetermined frame number threshold, the GPU selects a predetermined number of video frame images from the loaded video frame images. For the predetermined number of video frame images, the GPU determines noise levels of the video frame images at the predetermined frame interval. Then, the GPU determines an average of the determined noise levels as the noise level of the video frame images.

For example, assuming that the predetermined frame number threshold is 500, for a video of less than 500 frames, images are selected at an interval of one frame, the noise levels of the selected images are evaluated, and the noise level of all images in the video is an average of the calculated noise levels. For a video with more than 500 frames, the first 500 frames are used to select images at the interval of one frame, the noise levels of the selected images are evaluated, and the noise level of all images in the video is an average of the calculated noise levels.

In this embodiment of the present disclosure, during the implementation of the two-step denoising of the NLB denoising method, the first-step denoising is performed using the NLM denoising algorithm replacing the NLB denoising algorithm, which avoids the problem of unstable denoising effect caused by using the NLB denoising algorithm to perform the first-step denoising.

Figure 4:
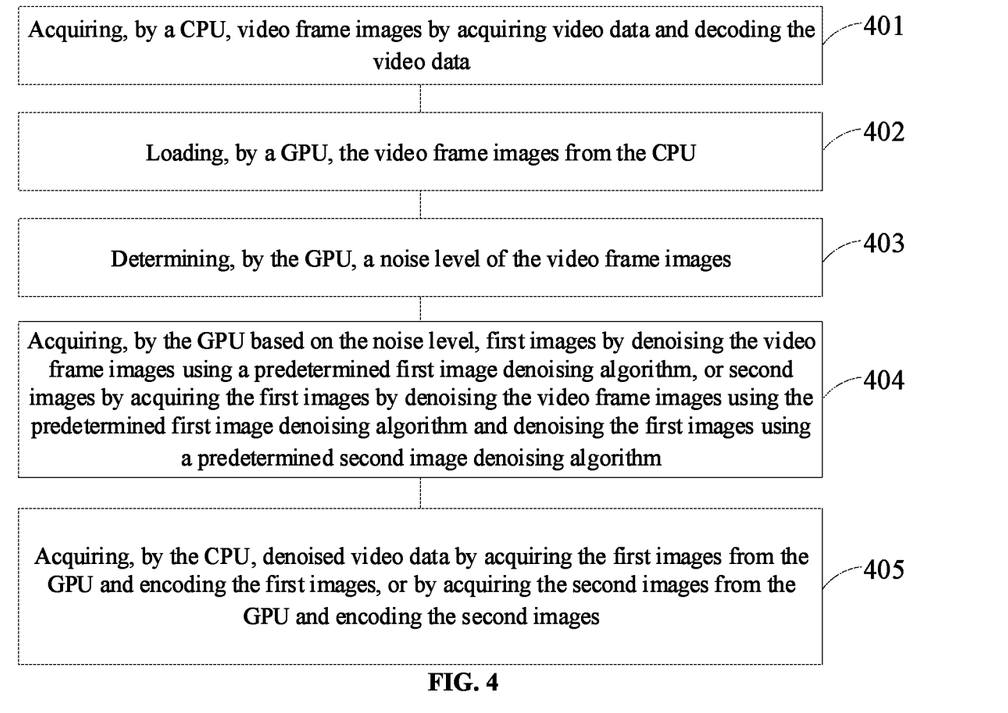
FIG. 4 is a flowchart of still another method for denoising videos according to an embodiment of the present disclosure.

FIG. 4 is a flowchart of still another method for denoising videos according to an embodiment of the present disclosure. The method is applicable to an electronic device including a CPU and a GPU and may specifically include the following processes.

In process 401, video frame images are acquired by the CPU by acquiring video data and decoding the video data.

In this embodiment of the present disclosure, the CPU may further fill the video frame images.

In process 402, the video frame images are loaded by the GPU from the CPU.

In process 403, a noise level of the video frame images is determined by the GPU.

In this embodiment of the present disclosure, process 403 may include: the GPU determines a number of the loaded video frame images; in the case that the number of the loaded video frame images is less than a predetermined frame number threshold, the GPU determines noise levels of the video frame images at a predetermined frame interval; and the GPU determines an average of the determined noise levels as the noise level of the video frame images.

In the case that the number of the loaded video frame images is greater than or equal to the predetermined frame number threshold, the GPU selects a predetermined number of video frame images from the loaded video frame images, determines noise levels of the video frame images in the predetermined number of video frame images at the predetermined frame interval, and determines an average of the determined noise levels as the noise level of the video frame images.

In process 404, first images are acquired, by the GPU based on the noise level, by denoising the video frame images using a predetermined first image denoising algorithm; or second images are acquired, by the GPU based on the noise level, by acquiring the first images by denoising the video frame images using the predetermined first image denoising algorithm and denoising the first images using a predetermined second image denoising algorithm.

In this embodiment of the present disclosure, process 404 may include the following sub-processes.

In sub-process S31, in the case that the noise level is less than a predetermined noise level threshold, the first images are acquired by the GPU by denoising the video frame images using the predetermined first image denoising algorithm.

The sub-process S31 may include: the GPU allocates threads to pixels in the video frame images; the thread determines a first reference image patch of the pixel and a corresponding first similar image patch; the thread determines a pixel distance and a coordinate distance of the first similar image patch relative to the first reference image patch; the thread calculates a weight of the first similar image patch based on the pixel distance and the coordinate distance; the thread determines a denoised value of the pixel based on the weight of the first similar image patch; and the GPU determines an image determined based on all denoised pixels as the first image.

In sub-process S32, in the case that the noise level is greater than or equal to the predetermined noise level threshold, the GPU acquires the second images by acquiring the first images by denoising the video frame images using the predetermined first image denoising algorithm and denoising the first images using the predetermined second image denoising algorithm.

The sub-process S32 may include the following processes.

The GPU allocates threads to pixels in the video frame images; the thread determines a first reference image patch of the pixel and a corresponding first similar image patch; the thread determines a pixel distance and a coordinate distance of the first similar image patch relative to the first reference image patch; the thread calculates a weight of the first similar image patch based on the pixel distance and the coordinate distance; the thread determines a denoised value of the pixel based on the weight of the first similar image patch; and the GPU determines an image determined based on all denoised pixels as the first image.

The GPU allocates threads to pixels in the first images; the thread determines a second reference image patch of the pixel in the first image and a corresponding second similar image patch; the thread calculates a covariance matrix of the second reference image patch based on the second similar image patch and the second reference image patch; the thread calculates a mean value of the first reference image patch based on the first reference image patch and the first similar image patch; the thread calculates denoised pixel values of the second reference image patch based on the covariance matrix of the second reference image patch and the mean value of the first reference image patch; the thread determines the denoised value of the pixel based on all denoised second reference image patches including the pixel; and the GPU determines an image determined based on all denoised pixels as the second image.

In process 405, denoised video data is acquired by the CPU by acquiring the first images from the GPU and encoding the first images, or by acquiring the second images from the GPU and encoding the second images.

In this embodiment of the present disclosure, upon a video captured by a user being decoded into video frame images, the GPU evaluates the noise level of the video frame images and selects different denoising strategies based on the noise level. Then, denoising is performed frame by frame, and the denoised video frame images are encoded. The encoded video occupies less memory. For a video with significant noise, the user's subjective perception can also be significantly improved upon denoising.

It should be noted that, for the sake of simplicity, the foregoing method embodiments are described as combinations of a series of actions, but persons skilled in the art can understand that the embodiments of the present disclosure are not limited by the sequence of actions described above, because some processes may be performed in other orders or at the same time according to the embodiments of the present disclosure. In addition, it should be understood by persons skilled in the art that the embodiments described in this specification are preferred embodiments and the involved actions are not necessarily needed for the embodiments of the present disclosure.

Figure 5:
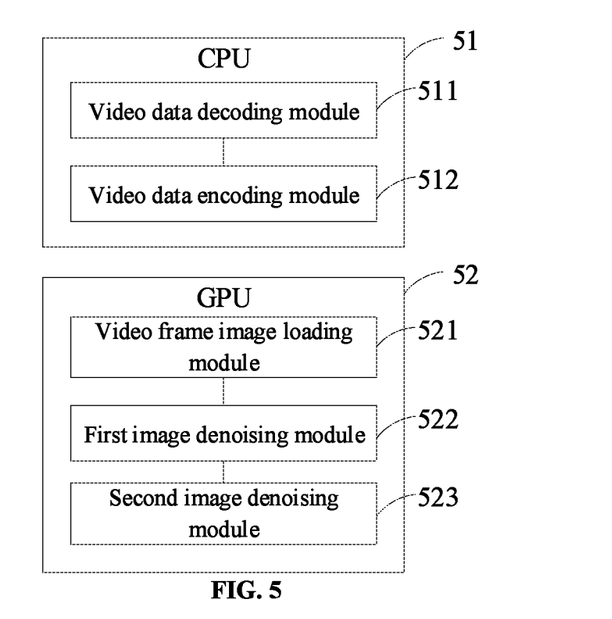
FIG. 5 is a structural block diagram of an electronic device according to an embodiment of the present disclosure.

FIG. 5 is a structural block diagram of an electronic device according to an embodiment of the present disclosure. The electronic device may specifically include a CPU 51 and a GPU 52.

The CPU 51 may include:
- a video data decoding module 511, configured to acquire video frame images by acquiring video data and decoding the video data; and
- a video data encoding module 512, configured to acquire denoised video data by acquiring second images from the GPU and encoding the second images.

The GPU 52 may include:
- a video frame image loading module 521, configured to load the video frame images from the CPU;
- a first image denoising module 522, configured to acquire first images by denoising the video frame images using a predetermined NLM denoising algorithm; and
- a second image denoising module 523, configured to acquire second images by denoising the first images using a predetermined NLB denoising algorithm.

In this embodiment of the present disclosure, the first image denoising module 522 may include:
- a first thread allocating submodule, configured to allocate threads to pixels in the video frame images; and
- a first image determining submodule, configured to determine an image determined based on all denoised pixels as the first image.

The thread may include:
- a first patch matching module, configured to determine a first reference image patch of the pixel and a corresponding first similar image patch;
- a distance determining module, configured to determine a pixel distance and a coordinate distance of a first similar image patch relative to the first reference image patch;
- a weight calculating module, configured to calculate a weight of the first similar image patch by the thread based on the pixel distance and the coordinate distance; and
- a pixel value estimating module, configured to determine a denoised value of the pixel based on the weight of the first similar image patch.

In this embodiment of the present disclosure, the second image denoising module 523 may include:
- a second thread allocating submodule, configured to allocate threads to pixels in the first images; and
- a second image determining submodule, configured to determine an image determined based on all denoised pixels as the second image.

The thread may include:
- a second patch matching module, configured to determine a second reference image patch of the pixel in the first image and a corresponding second similar image patch;
- a covariance matrix calculating module, configured to calculate a covariance matrix of the second reference image patch based on the second similar image patch and the second reference image patch;
- an image patch mean value calculating module, configured to calculate a mean value of the first reference image patch based on the first reference image patch and the first similar image patch;
- an image patch pixel value estimating module, configured to calculate denoised pixel values of the second reference image patch based on the covariance matrix of the second reference image patch and the mean value of the first reference image patch; and
- a second pixel value estimating module, configured to determine the denoised value of the pixel based on all denoised second reference image patches including the pixel.

In this embodiment of the present disclosure, the GPU 52 may further include:
- a noise level determining module, configured to: prior to acquiring the second images by the second image denoising module by denoising the first images using the predetermined NLB denoising algorithm, determine a noise level of the video frame images.

The second image denoising module may further include:
- a second image denoising submodule, configured to: in the case that the noise level is greater than or equal to a predetermined noise level threshold, acquire the second images by denoising the first images using the predetermined NLB denoising algorithm.

In this embodiment of the present disclosure, the GPU 52 may further include:
- a first sub-image segmenting module, configured to segment the video frame image into a plurality of first sub-images upon the first thread allocating submodule allocating the threads to the pixels in the video frame images;
- a first thread block configuring module, configured to configure the threads corresponding to pixels belonging to a same first sub-image to a same thread block; and
- a first data allocating module, configured to allocate data required for executing the NLM denoising algorithm to the thread block.

The thread may further include:
- a first cooperative reading module, configured to: in the case that the threads in the same thread block are executed in terms of warps, cooperatively read the required data into a shared memory of the GPU.

In this embodiment of the present disclosure, the GPU 52 may further include:
- a second sub-image segmenting module, configured to segment the first image into a plurality of second sub-images upon the second thread allocating submodule allocating the threads to the pixels in the first images;
- a second thread block configuring module, configured to configure the threads corresponding to pixels belonging to a same second sub-image to a same thread block; and
- a second data allocating module, configured to allocate data required for executing the NLB denoising algorithm to the thread block.

The thread may further include:
- a second cooperative reading module, configured to: in the case that the threads in the same thread block are executed in terms of warps, cooperatively read the required data into the shared memory of the GPU.

In this embodiment of the present disclosure, the first patch matching module may include: a first reference image patch determining submodule, configured to determine the first reference image patch by taking the pixel as a center;
  a first search box acquiring submodule, configured to acquire a corresponding first search box from the shared memory of the GPU; and
  a first similar image patch determining submodule, configured to determine the first similar image patch corresponding to the first reference image patch in the first search box at a predetermined first pixel interval.

In this embodiment of the present disclosure, the second patch matching module may include:
  a second reference image patch determining submodule, configured to determine the second reference image patch by taking the pixel as a center;
  a second search box acquiring submodule, configured to acquire a corresponding second search box from the shared memory of the GPU; and
  a second similar image patch determining submodule, configured to determine a second similar image patch corresponding to the second reference image patch in the second search box at a predetermined second pixel interval.

In this embodiment of the present disclosure, the noise level determining module may include:
  an image number determining submodule, configured to determine a number of the loaded video frame images;
  a first noise level determining submodule, configured to: in the case that the number of the loaded video frame images is less than a predetermined frame number threshold, determine noise levels of the video frame images at a predetermined frame interval; and
  a second noise level determining submodule, configured to determine an average of the determined noise levels as the noise level of the video frame images.

In this embodiment of the present disclosure, the noise level determining module may further include:
  a video frame image selecting submodule, configured to: in the case that the number of the loaded video frame images is greater than or equal to the predetermined frame number threshold, select a predetermined number of video frame images from the loaded video frame images;
  a third noise level determining submodule, configured to determine noise levels of the video frame images in the predetermined number of video frame images at the predetermined frame interval; and
  a fourth noise level determining submodule, configured to determine an average of the determined noise levels as the noise level of the video frame images.

In this embodiment of the present disclosure, the CPU 51 may further include:
  an image filling module, configured to: prior to the video data decoding module acquiring the video frame images by decoding the video data, fill the video frame images.

In this embodiment of the present disclosure, during the implementation of the two-step denoising of the NLB denoising method, the first-step denoising is performed using the NLM denoising algorithm replacing the NLB denoising algorithm, which avoids the problem of unstable denoising effect caused by using the NLB denoising algorithm to perform the first-step denoising.

Figure 6:
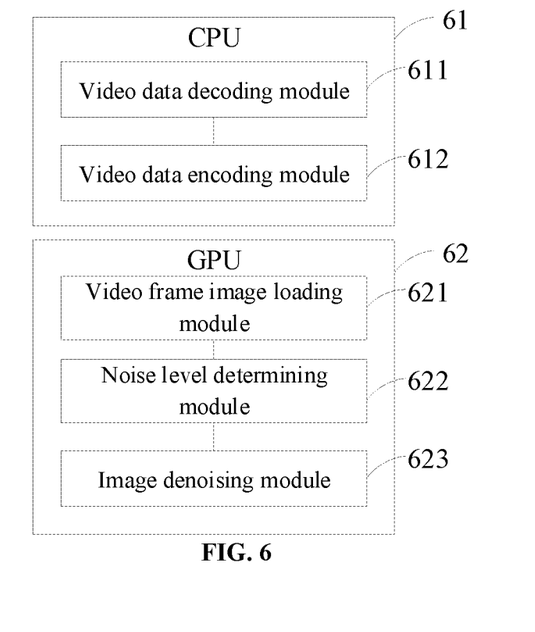
FIG. 6 is a structural block diagram of another electronic device according to an embodiment of the present disclosure.

FIG. 6 is a structural block diagram of another electronic device according to an embodiment of the present disclosure. The electronic device may specifically include a CPU 61 and a GPU 62.

The CPU 61 may include:
  a video data decoding module 611, configured to acquire video frame images by acquiring video data and decoding the video data; and
  a video data encoding module 612, configured to acquire denoised video data by acquiring first images from the GPU and encoding the first images, or by acquiring second images from the GPU and encoding the second images.

The GPU 62 may include:
  a video frame image loading module 621, configured to load the video frame images from the CPU;
  a noise level determining module 622, configured to determine a noise level of the video frame images; and
  an image denoising module 623, configured to: acquire, based on the noise level, first images by denoising the video frame images using a predetermined first image denoising algorithm, or second images by acquiring the first images by denoising the video frame images using the predetermined first image denoising algorithm and denoising the first images using a predetermined second image denoising algorithm.

In this embodiment of the present disclosure, the image denoising module 623 may include:
  a first image denoising submodule, configured to: in the case that the noise level is less than a predetermined noise level threshold, acquire the first images by denoising the video frame images using the predetermined first image denoising algorithm; and
  a second image denoising submodule, configured to: in the case that the noise level is greater than or equal to the predetermined noise level threshold, acquire the second images by acquiring the first images by denoising the video frame images using the predetermined first image denoising algorithm, and denoising the first images using the predetermined second image denoising algorithm.

In this embodiment of the present disclosure, the first image denoising submodule may include:
  a first thread allocating unit, configured to allocate threads to pixels in the video frame images; and
  a first image determining unit, configured to determine an image determined based on all denoised pixels as the first image.

The thread may include:
  a first patch matching module, configured to determine a first reference image patch of the pixel and a corresponding first similar image patch;
  a distance determining module, configured to determine a pixel distance and a coordinate distance of the first similar image patch relative to the first reference image patch;
  a weight calculating module, configured to calculate a weight of the first similar image patch based on the pixel distance and the coordinate distance; and
  a pixel value estimating module, configured to determine a denoised value of the pixel based on the weight of the first similar image patch.

In this embodiment of the present disclosure, the second image denoising submodule may include:
  a second thread allocating unit, configured to allocate threads to pixels in the first images; and a second image determining unit, configured to determine an image determined based on all denoised pixels as the second image.

The thread may include:

a second patch matching module, configured to determine a second reference image patch of the pixel in the first image and a corresponding second similar image patch;

a covariance matrix calculating module, configured to calculate a covariance matrix of the second reference image patch based on the second similar image patch and the second reference image patch;

an image patch mean value calculating module, configured to calculate a mean value of the first reference image patch based on the first reference image patch and the first similar image patch;

an image patch pixel value estimating module, configured to calculate denoised pixel values of the second reference image patch based on the covariance matrix of the second reference image patch and the mean value of the first reference image patch; and a second pixel value estimating module, configured to determine the denoised value of the pixel based on all denoised second reference image patches including the pixel.

In this embodiment of the present disclosure, upon a video captured by a user being decoded into video frame images, the GPU evaluates the noise level of the video frame images and selects different denoising strategies based on the noise level. Then, denoising is performed frame by frame, and the denoised video frame images are encoded. The encoded video occupies less memory. For a video with significant noise, the user's subjective perception can also be significantly improved upon denoising.

Because the device embodiments are basically similar to the method embodiments, the description for the device embodiments is relatively simple, and reference can be made to the descriptions of the method embodiments.

The embodiments of the present disclosure further provide a device, including:

a processor, a memory, and a computer program stored in the memory and runnable on the processor. The computer program, when run on the processor, causes the processor to perform processes of the method for denoising videos as defined in the foregoing embodiments and achieve the same technical effects. To avoid repetition, details are not described herein again.

The embodiments of the present disclosure further provide a computer-readable storage medium. The computer-readable storage medium stores a computer program. The computer program, when run on a processor, causes the processor to perform the processes of the method for denoising videos as defined in the foregoing embodiments and achieves the same technical effects. To avoid repetition, details are not described herein again.

The embodiments of this specification are described in a progressive manner. Each embodiment focuses on differences of the embodiment from other embodiments, and the same or similar parts between various embodiments may refer to each other. The term "one embodiment," "embodiment," or "one or more embodiments" mentioned herein means that a specific feature, structure, or characteristic described in combination with the embodiment is included in at least one embodiment of the present disclosure. In addition, it should be noted that phrase like "in an embodiment" herein does not necessarily refer to a same embodiment. In the specification provided herein, numerous specific details are described. However, it can be understood that the embodiments of the present disclosure can be implemented without the specific details. In some embodiments, well-known methods, structures, and techniques are not shown in detail to avoid obscuring this specification. In the claims, any reference sign between brackets should not be considered as a limitation on the claims. The word "include" does not exclude the presence of elements or processes not listed in the claims. The word "one" or "a/an" preceding an element does not exclude the existence of a plurality of such elements. The present disclosure can be implemented by hardware including several different components with the assistance of a properly programmed computer. In the unit claims in which several apparatuses are listed, several of the apparatuses may be embodied by a same hardware item. The use of words such as first, second, and third do not indicate any order. The words may be interpreted as names. Finally, it should be noted that the foregoing embodiments are merely used to explain the technical solutions of the present disclosure, but are not intended to limit the present disclosure. Although the present disclosure is described in detail with reference to the foregoing embodiments, the persons of ordinary skill in the art should understand that a person of ordinary skill in the art can still modify the technical solutions described in the foregoing embodiments, or make equivalent substitutions on some or all technical features therein. These modifications or substitutions do not make the essence of the corresponding technical solutions deviate from the concept and scope of the technical solutions of the embodiments of the present disclosure.

What is claimed is:

1. A method for denoising videos, applicable to an electronic device comprising a central processing unit (CPU) and a graphics processing unit (GPU), the method comprising:

acquiring, by the CPU, video frame images by acquiring video data captured by a user and decoding the video data;

loading, by the GPU, the video frame images from the CPU;

acquiring, by the GPU, first images by denoising the video frame images using a predetermined non-local means (NLM) denoising algorithm;

determining, by the GPU, a noise level of the video frame images;

in response to the noise level being greater than or equal to a predetermined noise level threshold, acquiring, by the GPU, second images by denoising the first images using a predetermined non-local Bayes (NLB) denoising algorithm; and acquiring, by the CPU, denoised video data by acquiring the second images from the GPU and encoding the second images, wherein the denoised video data is then shared on a social platform;

wherein determining, by the GPU, the noise level of the video frame images comprises:

determining, by the GPU, a numerical count of the loaded video frame images;

in response to the count of the loaded video frame images being less than a predetermined frame number threshold, determining, by the GPU, noise levels of the video frame images at a predetermined frame interval; and determining, by the GPU, an average of the determined noise levels as the noise level of the video frame images.

2. The method according to claim 1, wherein acquiring, by the GPU, the first images by denoising the video frame images using the predetermined NLM denoising algorithm comprises:
- allocating, by the GPU, threads to pixels in the video frame images;
- determining, by the thread, a first reference image patch of the pixel and a corresponding first similar image patch;
- determining, by the thread, a pixel distance and a coordinate distance of the first similar image patch relative to the first reference image patch;
- calculating, by the thread, a weight of the first similar image patch based on the pixel distance and the coordinate distance;
- determining, by the thread, a denoised value of the pixel based on the weight of the first similar image patch; and
- determining, by the GPU, an image determined based on all denoised pixels as the first image.

3. The method according to claim 2, wherein acquiring, by the GPU, the second images by denoising the first images using the predetermined NLB denoising algorithm comprises:
- allocating, by the GPU, threads to pixels in the first images;
- determining, by the thread, a second reference image patch of the pixel in the first image and a corresponding second similar image patch;
- calculating, by the thread, a covariance matrix of the second reference image patch based on the second similar image patch and the second reference image patch;
- calculating, by the thread, a mean value of the first reference image patch based on the first reference image patch and the first similar image patch;
- calculating, by the thread, denoised pixel values of the second reference image patch based on the covariance matrix of the second reference image patch and the mean value of the first reference image patch;
- determining, by the thread, a denoised value of the pixel in the first image based on all denoised second reference image patches comprising the pixel; and
- determining, by the GPU, an image determined based on all denoised pixels as the second image.

4. The method according to claim 3, wherein upon allocating, by the GPU, the threads to the pixels in the first images, the method further comprises:
- segmenting, by the GPU, the first image into a plurality of second sub-images;
- configuring, by the GPU, the threads corresponding to the pixels belonging to a same second sub-image to a same thread block;
- allocating, by the GPU, data required for executing the NLB denoising algorithm to the thread block; and
- in the case that the threads in the same thread block are executed in terms of warps, cooperatively reading, by the threads in the warps, the required data into a shared memory of the GPU.

5. The method according to claim 3, wherein determining, by the thread, the second reference image patch of the pixel in the first image and the corresponding second similar image patch comprises:
- determining, by the thread, the second reference image patch by taking the pixel as a center;
- acquiring, by the thread, a corresponding second search box from a shared memory of the GPU; and
- determining, by the thread, the second similar image patch corresponding to the second reference image patch in the second search box at a predetermined second pixel interval.

6. The method according to claim 2, wherein upon allocating, by the GPU, the threads to the pixels in the video frame images, the method further comprises:
- segmenting, by the GPU, the video frame image into a plurality of first sub-images;
- configuring, by the GPU, the threads corresponding to the pixels belonging to a same first sub-image to a same thread block;
- allocating, by the GPU, data required for executing the NLM denoising algorithm to the thread block; and
- in the case that the threads in the same thread block are executed in terms of warps, cooperatively reading, by the threads in the warps, the required data into a shared memory of the GPU.

7. The method according to claim 2, wherein determining, by the thread, the first reference image patch of the pixel and the corresponding first similar image patch comprises:
- determining, by the thread, the first reference image patch by taking the pixel as a center;
- acquiring, by the thread, a corresponding first search box from a shared memory of the GPU; and
- determining, by the thread, the first similar image patch corresponding to the first reference image patch in the first search box at a predetermined first pixel interval.

8. The method according to claim 1, wherein determining, by the GPU, the noise level of the video frame images further comprises:
- in the case that the number of the loaded video frame images is greater than or equal to the predetermined frame number threshold, selecting, by the GPU, a predetermined number of video frame images from the loaded video frame images;
- determining, by the GPU, noise levels of the video frame images in the predetermined number of video frame images at the predetermined frame interval; and
- determining, by the GPU, an average of the determined noise levels as the noise level of the video frame images.

9. The method according to claim 1, wherein upon acquiring, by the CPU, the video frame images by decoding the video data, the method further comprises:
- filling, by the CPU, the video frame images.

10. A non-transitory computer-readable storage medium storing a computer program, wherein the computer program, when loaded and run by a processor of a device, causes the device to perform processes of the method for denoising videos as defined in claim 1.

11. A method for denoising videos, applicable to an electronic device comprising a central processing unit (CPU) and a graphics processing unit (GPU), the method comprising:
- acquiring, by the CPU, video frame images by acquiring video data captured by a user and decoding the video data;
- loading, by the GPU, the video frame images from the CPU;
- determining, by the GPU, a noise level of the video frame images;
- acquiring, by the GPU based on the noise level, first images by denoising the video frame images using a predetermined first image denoising algorithm, or second images by acquiring the first images by denoising the video frame images using the predetermined first image denoising algorithm and denoising the first images using a predetermined second image denoising algorithm; and acquiring, by the CPU, denoised video data by acquiring the first images from the GPU and encoding the first images, or by acquiring the second images from the GPU and encoding the second images, wherein the denoised video data is then shared on a social platform;

wherein determining, by the GPU, the noise level of the video frame images comprises:

determining, by the GPU, a numerical count of the loaded video frame images;

in response to the count of the loaded video frame images being less than a predetermined frame number threshold, determining, by the GPU, noise levels of the video frame images at a predetermined frame interval; and determining, by the GPU, an average of the determined noise levels as the noise level of the video frame images.

12. The method according to claim 11, wherein acquiring, by the GPU based on the noise level, the first images by denoising the video frame images using the predetermined first image denoising algorithm, or the second images by acquiring the first images by denoising the video frame images using the predetermined first image denoising algorithm and denoising the first images using the predetermined second image denoising algorithm comprises:

in the case that the noise level is less than a predetermined noise level threshold, acquiring, by the GPU, the first images by denoising the video frame images using the predetermined first image denoising algorithm; and in the case that the noise level is greater than or equal to the predetermined noise level threshold, acquiring, by the GPU, the second images by acquiring the first images by denoising the video frame images using the predetermined first image denoising algorithm and denoising the first images using the predetermined second image denoising algorithm.

13. The method according to claim 12, wherein acquiring, by the GPU, the first images by denoising the video frame images using the predetermined first image denoising algorithm comprises:

allocating, by the GPU, threads to pixels in the video frame images;

determining, by the thread, a first reference image patch of the pixel and a corresponding first similar image patch;

determining, by the thread, a pixel distance and a coordinate distance of the first similar image patch relative to the first reference image patch;

calculating, by the thread, a weight of the first similar image patch based on the pixel distance and the coordinate distance;

determining, by the thread, a denoised value of the pixel based on the weight of the first similar image patch; and determining, by the GPU, an image determined based on all denoised pixels as the first image.

14. The method according to claim 13, wherein acquiring, by the GPU, the second images by denoising the first images by using the predetermined second image denoising algorithm comprises:

allocating, by the GPU, threads to pixels in the first images;

determining, by the thread, a second reference image patch of the pixel in the first image and a corresponding second similar image patch;

calculating, by the thread, a covariance matrix of the second reference image patch based on the second similar image patch and the second reference image patch;

calculating, by the thread, a mean value of the first reference image patch based on the first reference image patch and the first similar image patch;

calculating, by the thread, denoised pixel values of the second reference image patch based on the covariance matrix of the second reference image patch and the mean value of the first reference image patch;

determining, by the thread, a denoised value of the pixel in the first image based on all denoised second reference image patches comprising the pixel; and determining, by the GPU, an image determined based on all denoised pixels as the second image.

15. An electronic device for denoising videos, comprising a central processing unit (CPU), a graphics processing unit (GPU), a memory, and a computer program stored in the memory and runnable on the CPU and the GPU, wherein the CPU and the GPU, when loading and running the computer program, is caused to perform processes of a method for denoising videos as defined in claim 11.

16. A non-transitory computer-readable storage medium storing a computer program, wherein the computer program, when loaded and run by a processor of a device, causes the device to perform processes of the method for denoising videos as defined in claim 11.

17. An electronic device for denoising videos, comprising a central processing unit (CPU), a graphics processing unit (GPU), a memory, and a computer program stored in the memory and runnable on the CPU and the GPU, wherein the CPU and the GPU, when loading and running the computer program, are caused to perform processes of a method for denoising videos, wherein the method comprises:

acquiring, by the CPU, video frame images by acquiring video data captured by a user and decoding the video data;

loading, by the GPU, the video frame images from the CPU;

acquiring, by the GPU, first images by denoising the video frame images using a predetermined non-local means (NLM) denoising algorithm;

determining, by the GPU, a noise level of the video frame images;

in response to the noise level being greater than or equal to a predetermined noise level threshold, acquiring, by the GPU, second images by denoising the first images using a predetermined non-local Bayes (NLB) denoising algorithm; and acquiring, by the CPU, denoised video data by acquiring the second images from the GPU and encoding the second images, wherein the denoised video data is then shared on a social platform;

wherein determining, by the GPU, the noise level of the video frame images comprises:

determining, by the GPU, a numerical count of the loaded video frame images;

in response to the count of the loaded video frame images being less than a predetermined frame number threshold, determining, by the GPU, noise levels of the video frame images at a predetermined frame interval; and determining, by the GPU, an average of the determined noise levels as the noise level of the video frame images.

18. The electronic device according to claim 17, wherein acquiring, by the GPU, the first images by denoising the video frame images using the predetermined NLM denoising algorithm comprises:
- allocating, by the GPU, threads to pixels in the video frame images;
- determining, by the thread, a first reference image patch of the pixel and a corresponding first similar image patch;
- determining, by the thread, a pixel distance and a coordinate distance of the first similar image patch relative to the first reference image patch;
- calculating, by the thread, a weight of the first similar image patch based on the pixel distance and the coordinate distance;
- determining, by the thread, a denoised value of the pixel based on the weight of the first similar image patch; and
- determining, by the GPU, an image determined based on all denoised pixels as the first image.

\* \* \* \* \*